(12) United States Patent
Kang et al.

(10) Patent No.: US 9,291,642 B2
(45) Date of Patent: Mar. 22, 2016

(54) FLEXIBLE NEAR FIELD OPTICAL IMAGING DEVICE INCLUDING FLEXIBLE OPTICAL HEAD WITH THIN FILM LAYER FOR FORMATION OF DYNAMIC OPTICAL NANO APERTURES

(71) Applicant: INDUSTRY-ACADEMIC COOPERATION FOUNDATION YONSEI UNIVERSITY, Seoul (KR)

(72) Inventors: Shinill Kang, Seoul (KR); Jungjin Han, Seoul (KR); Eikhyun Cho, Seoul (KR); Jongmyeong Shim, Seoul (KR); Wonjoon Choi, Seoul (KR); Se-Young Choi, Goyang-si (KR)

(73) Assignee: INDUSTRY-ACADEMIC COOPERATION FOUNDATION YONSEI UNIVERSITY, Seoul (KR)

( * ) Notice: Subject to any disclaimer, the term of this patent is extended or adjusted under 35 U.S.C. 154(b) by 0 days.

(21) Appl. No.: 14/813,009

(22) Filed: Jul. 29, 2015

(65) Prior Publication Data

US 2016/0033549 A1    Feb. 4, 2016

(30) Foreign Application Priority Data

Jul. 29, 2014 (KR) .......................... 10-2014-0096838

(51) Int. Cl.
*G01Q 60/22* (2010.01)

(52) U.S. Cl.
CPC ..................... *G01Q 60/22* (2013.01)

(58) Field of Classification Search
USPC ....................................... 850/32, 30
See application file for complete search history.

(56) References Cited

U.S. PATENT DOCUMENTS

| 8,535,616 B2 * | 9/2013 | Blair | ...................... B82Y 20/00 250/201.3 |
| 2009/0201475 A1 * | 8/2009 | Peckerar | ................... G03F 1/14 355/53 |

FOREIGN PATENT DOCUMENTS

| JP | 2001-066783 A | 3/2001 |
| JP | 2004-310985 A | 11/2004 |
| JP | 2007-139466 A | 6/2007 |
| JP | 2009-036693 A | 2/2009 |
| KR | 10-2009-0113038 A | 10/2009 |

* cited by examiner

*Primary Examiner* — Kiet T Nguyen
(74) *Attorney, Agent, or Firm* — LRK Patent Law Firm

(57) ABSTRACT

A near field optical imaging device includes: a light source for radiating light of a far field optical system; and an optical head including thin film layer for formation of dynamic optical nano apertures, combined with a measured object in one piece to generate a near field by a beam radiated from the light source, in which the measured object can be scanned in a depth direction by adjusting a depth of the near field, and the depth of the near field is adjusted by modifying a shape of an opening of the thin film layer for formation of dynamic optical nano apertures by adjusting an amount of the light radiated from the light source.

18 Claims, 11 Drawing Sheets

FLEXIBLE NEAR FIELD OPTICAL IMAGING DEVICE INCLUDING FLEXIBLE OPTICAL HEAD WITH THIN FILM LAYER FOR FORMATION OF DYNAMIC OPTICAL NANO APERTURES

BACKGROUND OF THE INVENTION

1. Field of the Invention

The present invention relates to an optical imaging device, and more specifically, to a flexible near field optical imaging device including a flexible optical head with thin film layer for formation of dynamic optical nano apertures.

2. Background of the Related Art

As industrialization of nano fusion technologies is progressed, the world market grows at an average annual growth rate of 20% or higher and is expected to reach a 2.5 trillion dollar level in 2020, and major countries establish polices for creating new industry by utilizing nano technologies. Particularly, considering that commercially applied portions of the nano imaging technology are small at present, the economic and industrial value of the nano imaging technology is expected to rise sharply in the future.

Recently, techniques of measuring nano scale structures and physical phenomena are required in a variety of fields, and an optical nano imaging technique is the only technique capable of in-situ, on-machine and in-vivo measurements among the nano scale measurement techniques. Although various measurement systems using a near field optical system such as a Near field Scanning Optical Microscope (NSOM) are developed as an optical measurement method of nano scale which does not make a special effect on a measured object, a measurement system using a generally and widely used single near field optical probe needs a high level technique for controlling a gap by approaching the probe within some tens of nanometers from a sample and has a limit in high-speed/large-area real-time imaging.

Although a parallel near field measurement system having a plurality of near field optical probes is proposed recently, it is almost impossible to make a measurement while maintaining a uniform gap across a wide area by the nature of a near field imaging system in which strict maintenance of a gap to the sample is essentially required. Therefore, development of a nano imaging technique of a new concept appropriate to large-area measurements of an in-situ, on-machine and in-vivo state is required.

Particularly, in the case of the bio/medical field, demands for a disease prediction technique through neurotransmission system analysis, molecule/bacteria imaging and the like are explosively increased as the medical paradigm moves from treatment to prevention, and techniques and products capable of performing real-time diagnosis on in-vivo and mass production thereof are required worldwide.

However, existing nano imaging techniques are disadvantageous in that a living cell cannot be observed since a preprocess such as fixing, dying and the like is required before imaging, and, in addition, when a measurement is conducted using an imaging technique having a resolution of nano unit such as a near field optical microscope or the like, an imaging area is very small as much as μm unit, and a time consumed for imaging is very long, and thus the technique cannot be applied to large-area high-speed imaging, and imaging analysis using an external imaging system should be performed by sampling some cell tissues.

In addition, an existing imaging technique using a near field or a probe should make a measurement while maintaining a gap of some tens of nm. However, if a measured object exercises in real-time or a sample is shaped in a curved surface, not a flat surface, precise real-time imaging cannot be performed since a precise gap to the sample is difficult to maintain and the imaging speed is low in the existing imaging technique.

FIG. 1 is a view showing near field nano imaging, and FIG. 2 is a view showing near field nano imaging, in which a probe is connected in parallel.

As shown in FIG. 1, there is a limit in applying the near field nano imaging to a large area due to the narrow imaging area, and there is a problem in that a gap of some nm level should be maintained for imaging.

FIG. 2 is a view showing a configuration of connecting a probe in parallel to overcome a narrow imaging area of near field nano imaging as shown in FIG. 1. However, as shown in FIG. 2, when the probe is connected in parallel, there is a problem in that if a measurement target is shaped in a curved surface, uniform imaging is difficult to achieve since an area in which near field light is generated and an area in which the near field light is not generated are created. That is, since the shape of a measurement target should have uniformity to apply the near field nano imaging to a large area, application targets are limited.

Furthermore, there is a problem in that it is difficult to control imaging to get an image of a measurement target at a desired position and size in a conventional near field nano imaging method, and it is difficult to acquire various information since only a light source of a single wavelength is used.

In addition, since a nano imaging device is generally capable of performing only surface imaging through a flat surface scanning method, it is difficult to acquire an image in the depth direction of a measured object.

SUMMARY OF THE INVENTION

In the embodiments of the present invention, there is provided a near field optical imaging device including a light source for radiating light of a far field optical system; and an optical head including thin film layer for formation of dynamic optical nano apertures, combined with a measured object in one piece to generate a near field by a beam radiated from the light source, in which the measured object can be scanned in a depth direction by adjusting depth of the near field, and the depth of the near field is adjusted by modifying the shape of the opening of the thin film layer for formation of dynamic optical nano apertures by adjusting the amount of the light radiated from the light source.

In addition, since the optical head with thin film layer for formation of dynamic optical nano apertures includes a flexible substrate layer for tightly attaching and combining the measured object regardless of whether an external shape of the measured object is a curved surface or a flat surface, and a thin film layer for formation of dynamic optical nano apertures, combined with the flexible substrate layer in one piece to generate a near field by a beam radiated from the light source, a high resolution can be provided, and the problem of maintaining a gap can be solved since the flexible substrate layer can be flexibly modified and easily and tightly attach the measured object regardless of whether the external shape of the measured object is a curved surface or a flat surface.

In addition, since the optical head with thin film layer for formation of dynamic optical nano apertures includes a first dielectric layer positioned on the top, a second dielectric layer positioned on the bottom, and a thin film layer for formation of dynamic optical nano apertures positioned between the first dielectric layer and the second dielectric layer and the thin film layer for formation of dynamic optical nano apertures is formed of a material having optical anisotropy, depth of the near field can be controlled by modifying the shape of the opening of the thin film layer for formation of dynamic optical nano apertures by adjusting the amount of radiated energy.

In addition, since imaging is accomplished by inducing a phenomenon of formation of dynamic optical nano apertures in a desired region, an optical system does not need to be aligned with the apertures separately.

In addition, since an anti-adhesion layer is further included on one side of the thin film layer for formation of dynamic optical nano apertures contacting with the measured object, friction and contamination of the measured object can be prevented.

In addition, in another embodiment of the present invention, since two or more light sources respectively having a different wavelength are used, various information can be acquired by acquiring information corresponding to each of the wavelengths.

To accomplish the above objects, according to one aspect of the present invention, there is provided a near field optical imaging device including: a light source for radiating light of a far field optical system, and an optical head with thin film layer for formation of dynamic optical nano apertures, combined with a measured object in one piece to generate a near field by a beam radiated from the light source, wherein the measured object can be scanned in a depth direction by adjusting a depth of the near field, and the depth of the near field is adjusted by modifying a shape of an opening of the thin film layer for formation of dynamic optical nano apertures by adjusting an amount of the light radiated from the light source.

In addition, the optical head with thin film layer for formation of dynamic optical nano apertures may include: a flexible substrate for tightly attaching and combining the measured object regardless of whether an external shape of the measured object is a curved surface or a flat surface; and a thin film layer for formation of dynamic optical nano apertures, combined with the flexible substrate layer in one piece to generate a near field by a beam radiated from the light source.

In addition, the optical system may include any one of macro optics, a hologram beam modulator, a Digital Micro mirror Device (DMD), a micro lens array and a scanner.

In addition, the optical head with thin film layer for formation of dynamic optical nano apertures may include a first dielectric layer positioned on a top, a second dielectric layer positioned on a bottom, and a thin film layer for formation of dynamic optical nano apertures positioned between the first dielectric layer and the second dielectric layer.

In addition, the thin film layer for formation of dynamic optical nano apertures may be a layer formed of a material having optical anisotropy.

In addition, in the thin film layer for formation of dynamic optical nano apertures, the depth of the near field may be adjusted in a process of changing the material having optical anisotropy from an optically non-transparent region to an optically transparent region.

In addition, the thin film layer for formation of dynamic optical nano apertures may be formed of a Sb—Se compound, AgOx or PtOx.

In addition, the first dielectric layer and the second dielectric layer may be formed of an oxide-based, nitride-based, carbide-based material.

In addition, the oxide-based material may be any one of SiOx, ZnS—SiOx, GeOx, AlOx, BeOx, ZrOx, BaTiOx, SrTiOx and TaOx.

In addition, the nitride-based material may be any one of SiNx, BNx and AlNx.

In addition, the carbide-based material may be SiCx.

In addition, the flexible substrate layer 100 may be a sort of film or glass, and any one of Polycarbonate (PC), Cycle olefin polymer (COP), polyimide (PI), Polyethylene terephthalate (PET), Oriented Poly prophylene (OPP), Polyethylene (PE), Poly prophylene (PP), Poly methyl methacrylate (PMMA) and acryl can be used as a film, and any one of Sodalime glass, borosilicate glass, fused silica glass, quartz and biocompatible polymer (polylactic acid (PLA), poly glycolic acid (PGA), poly lactic co glycolic acid (PLGA), Poly L Lactic Acid (LPLA), Poly DL Lactic Acid (DLPLA), poly capro lactone (PCL), poly dioxanone (PDO) or Polydimethylsiloxane (PDMS)) can be used as a glass.

In addition, thickness of the first dielectric layer may be 30 to 500 nm, thickness of the thin film layer for formation of dynamic optical nano apertures may be 5 to 30 nm, and thickness of the second dielectric layer may be 5 to 60 nm.

In addition, thickness of the film may be 0.04 to 500 km.

In addition, the optical head with thin film layer for formation of dynamic optical nano apertures may further include an anti-adhesion layer for preventing friction and contamination of the measured object on one side of the thin film layer for formation of dynamic optical nano apertures contacting with the measured object.

In addition, the near field optical imaging device may further include: a relay lens unit through which light proceeding toward the measured object or reflected from the measured object passes and including one or more lenses for focusing the light radiated from the light source; a multi-light array unit into which the light focused through the relay lens unit enters; and a photo detector for detecting light from the measured object.

In addition, the photo detector may be positioned under the measured object.

According to another aspect of the present invention, there is provided a near field optical imaging device including: a first light source for radiating light of a first wavelength; a second light source for radiating light of a second wavelength; a relay lens unit through which light proceeding toward the measured object or reflected from the measured object passes and including one or more lenses for focusing the light radiated from the first light source or the second light source; a multi-light array unit into which the light focused through the relay lens unit enters; a thin film layer for formation of dynamic optical nano apertures, for generating a near field by the light radiated from the light sources and passing through the multi-light array unit; and a photo detector for detecting light from the measured object, wherein a depth of the near field is adjusted by modifying a shape of an opening of the thin film layer for formation of dynamic optical nano apertures by adjusting an amount of the light radiated from the first light source or the second light source, and the depth of the near field generated by the first light source is different from the depth of the near field generated by the second light source.

DETAILED DESCRIPTION OF THE PREFERRED EMBODIMENT

The configuration and operation according to an embodiment of the present invention will be hereafter described in detail with reference to the accompanying drawings.

Figure 1:
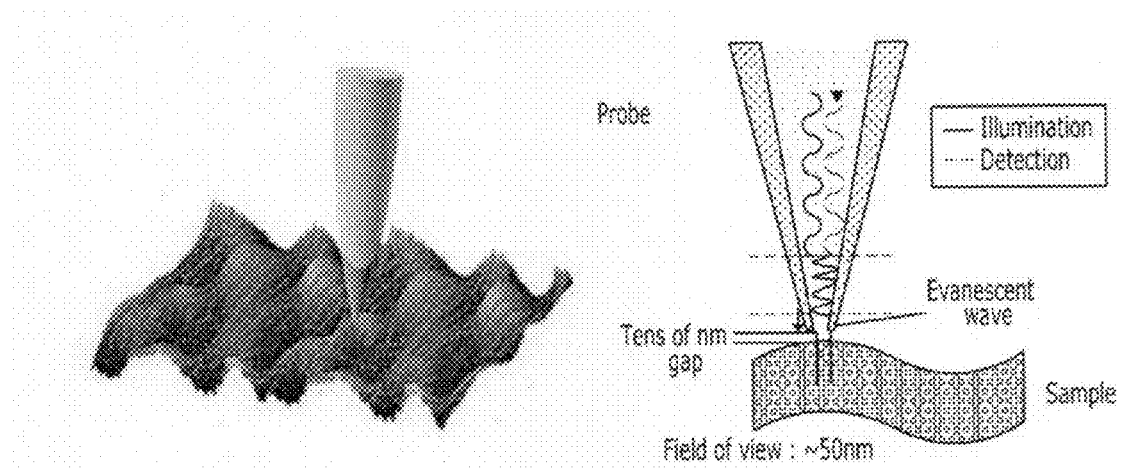
FIG. 1 is a view showing near field nano imaging.
Figure 2:
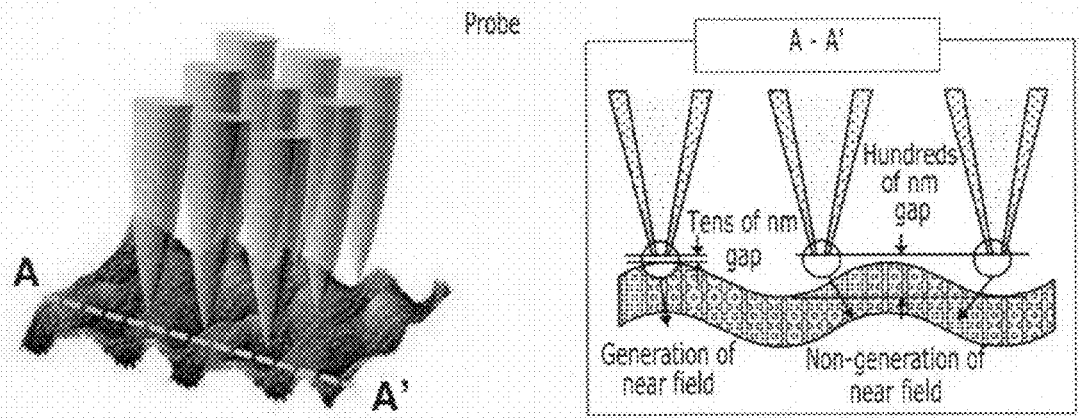
FIG. 2 is a view showing near field nano imaging, in which a probe is connected in parallel.
Figure 3:
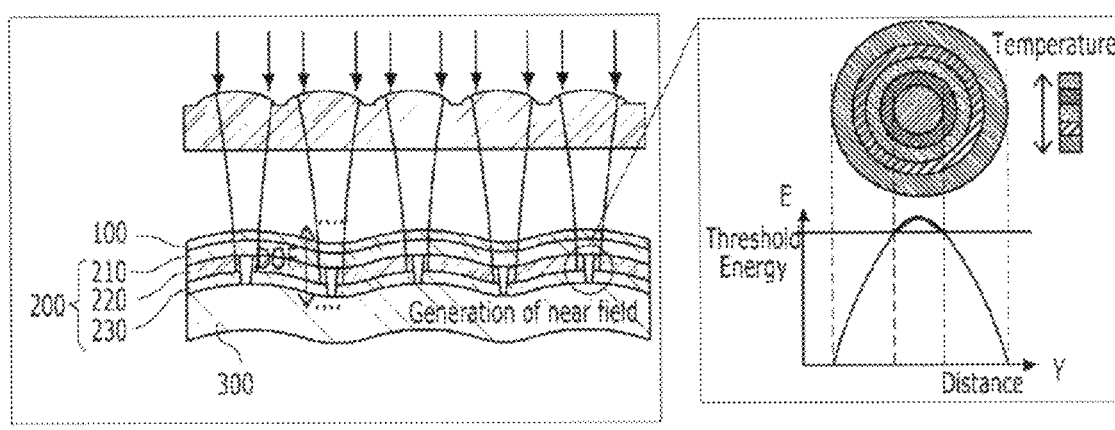
FIG. 3 is a view showing the concept of near field imaging according to an embodiment of the present invention.

FIG. 3 is a view showing the concept of near field imaging according to an embodiment of the present invention.

Referring to FIG. 3, there is provided a near field optical imaging device according to an embodiment of the present invention, including a light source for radiating light of a far field optical system; and a thin film layer for formation of dynamic optical nano apertures, combined with a measured object in one piece to generate a near field by a beam radiated from the light source, in which the measured object can be scanned in a depth direction by adjusting a depth of the near field, and the depth of the near field is adjusted by modifying the shape of the opening of the thin film layer for formation of dynamic optical nano apertures by adjusting the amount of the light radiated from the light source.

The thin film layer for formation of dynamic optical nano apertures is a part for generating a near field by a beam radiated from the light source of the far field optical system and includes a flexible substrate 100 for tightly attaching and combining the measured object 300 regardless of whether an external shape of the measured object 300 is a curved surface or a flat surface, and an optical head including a thin film layer for formation of dynamic optical nano apertures 200 combined with the flexible substrate layer 100 in one piece to generate a near field by a beam radiated from the light source.

In addition, the optical head including a thin film layer for formation of dynamic optical nano apertures 200 includes a first dielectric layer 210 positioned on the top, a second dielectric layer 230 positioned on the bottom, and a thin film layer for formation of dynamic optical nano apertures 220 formed of a material having optical anisotropy and positioned between the first dielectric layer 210 and the second dielectric layer 230.

Accordingly, if the thin film layer for formation of dynamic optical nano apertures is put on the measured object 300 and light more than a predetermined energy is radiated from the light source through a micro lens array 400, changes of optical properties occur in the thin film layer for formation of dynamic optical nano apertures 220, and a nano opening for generating a near field is formed.

Figure 4:
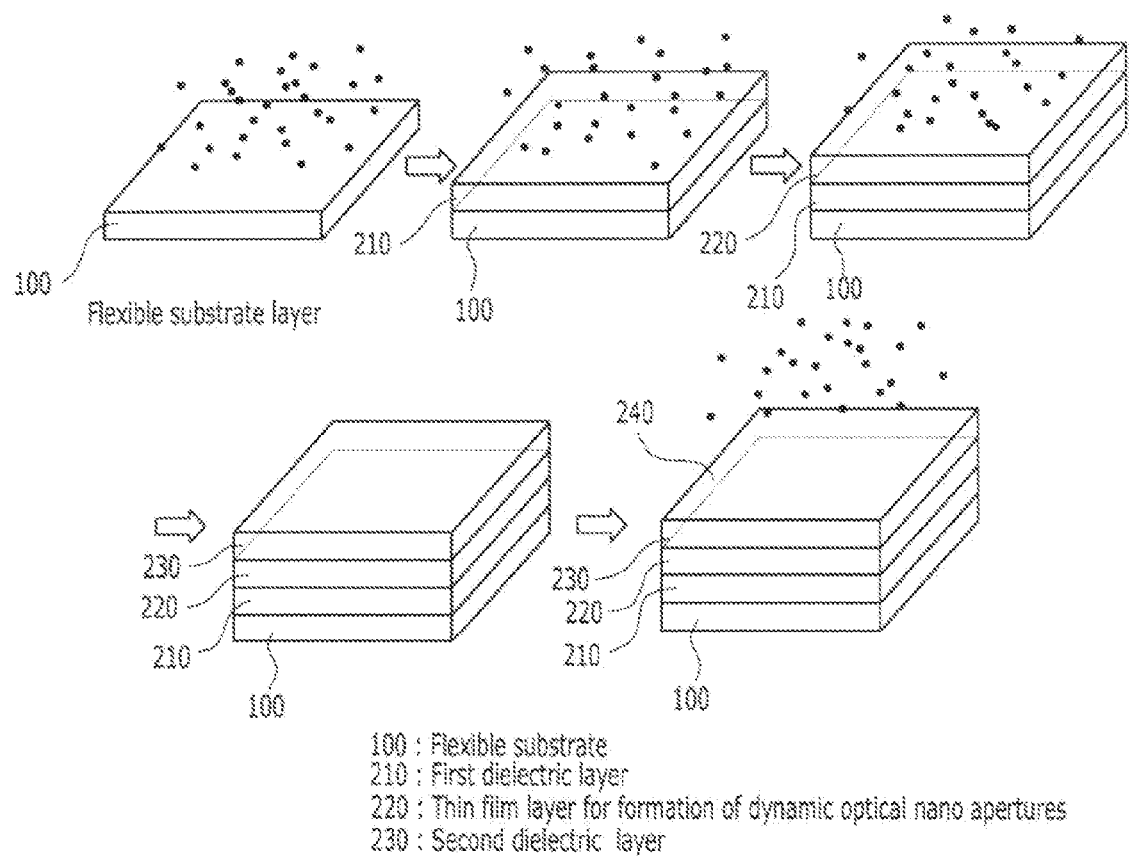
FIG. 4 is a view showing a process of manufacturing an optical head with a thin film layer for formation of dynamic optical nano apertures used in an embodiment of the present invention.

FIG. 4 is a view showing a process of manufacturing an optical head including a thin film layer for formation of dynamic optical nano apertures used in an embodiment of the present invention. Referring to FIG. 4, the optical head including thin film layer for formation of dynamic optical nano apertures used in an embodiment of the present invention is manufactured by depositing the first dielectric layer 210 on the flexible substrate layer 100, depositing the thin film layer for formation of dynamic optical nano apertures 220 (a layer for formation of dynamic optical nano apertures) on the top of the deposited first dielectric protection layer 210, and then depositing the second dielectric layer 230 thereon.

At this point, an anti-adhesion layer 240 for preventing friction and contamination of the measured object 300 can be further deposited on one side of the flexible thin film layer for formation of dynamic optical nano apertures 200 contacting with the measured object 300.

It is characterized in that the first dielectric layer 210 and the second dielectric layer 230 are oxide-based, nitride-based, carbide-based materials, and any one of SiOx, ZnS—SiOx, GeOx, AlOx, BeOx, ZrOx, BaTiOx, SrTiOx and TaOx can be used as an oxide-based material, any one of SiNx, BNx and AlNx can be used as a nitride-based material, and SiCx can be used as a carbide-based material.

The flexible substrate 100 is a sort of film or glass, and any one of Polycarbonate (PC), Cyclo olefin polymer (COP), polyimide (PI), Polyethylene terephthalate (PET), Oriented Poly prophylene (OPP), Polyethylene (PE), Poly prophylene (PP), Poly methyl methacrylate (PMMA) and acryl can be used as a film, and any one of Sodalime glass, borosilicate glass, fused silica glass, quartz and biocompatible polymer (polylactic acid (PLA), poly glycolic acid (PGA), poly lactic co glycolic acid (PLGA), Poly L Lactic Acid (LPLA), Poly DL Lactic Acid (DLPLA), poly capro lactone (PCL), poly dioxanone (PDO) or Polydimethylsiloxane (PDMS)) can be used as a glass.

The optical head including thin film layer for formation of dynamic optical nano apertures used in an embodiment of the present invention may be manufactured in a variety of thickness as needed, and thickness of the first dielectric layer 210 is 30 to 500 nm, thickness of the material thin film layer for formation of dynamic optical nano apertures 220 is 5 to 30 nm, and thickness of the second dielectric layer 230 is 5 to 60 nm, and a film in a thickness range of 0.04 to 500 μm can be used as the flexible substrate 100.

Figure 5:
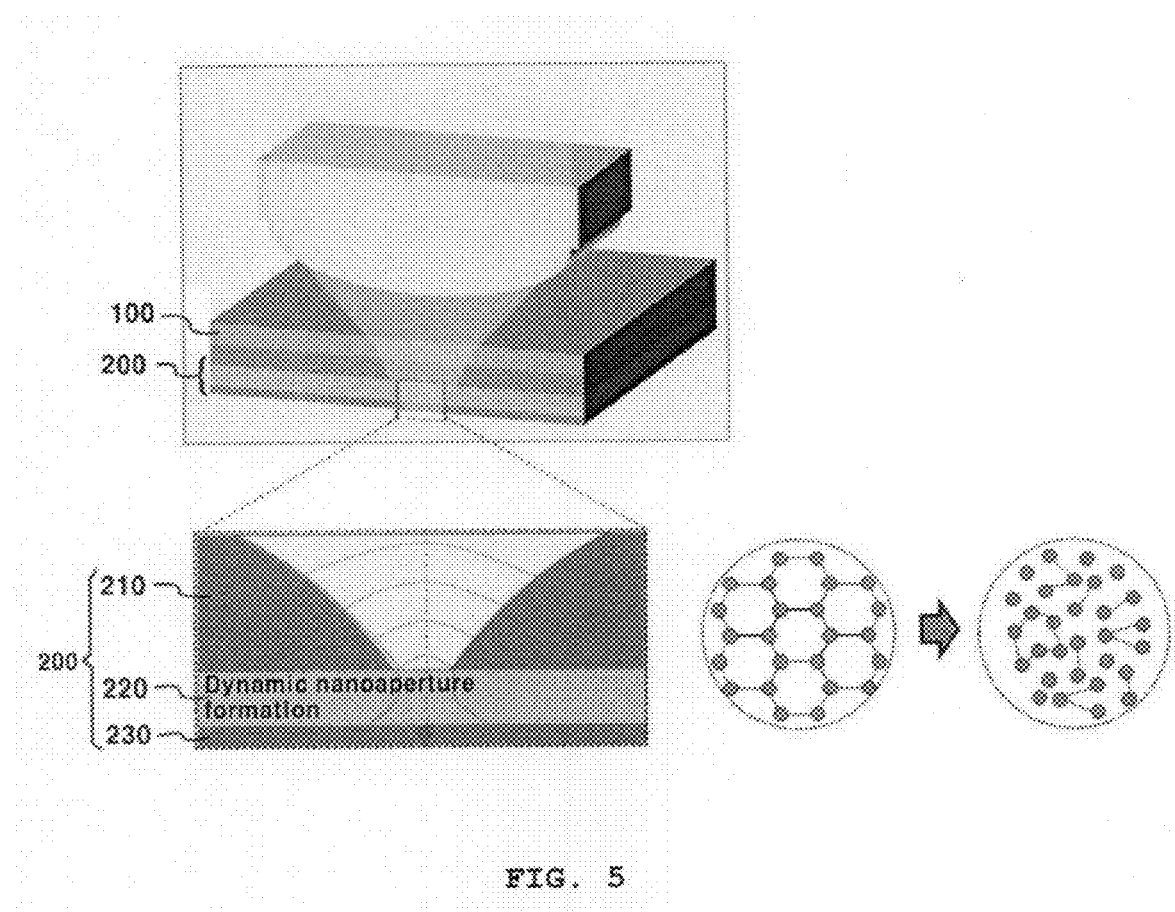
FIG. 5 is a view showing transition from an optically non-transparent region to an optically transparent region in a thin film layer for formation of dynamic optical nano apertures used in an embodiment of the present invention.
Figure 6:
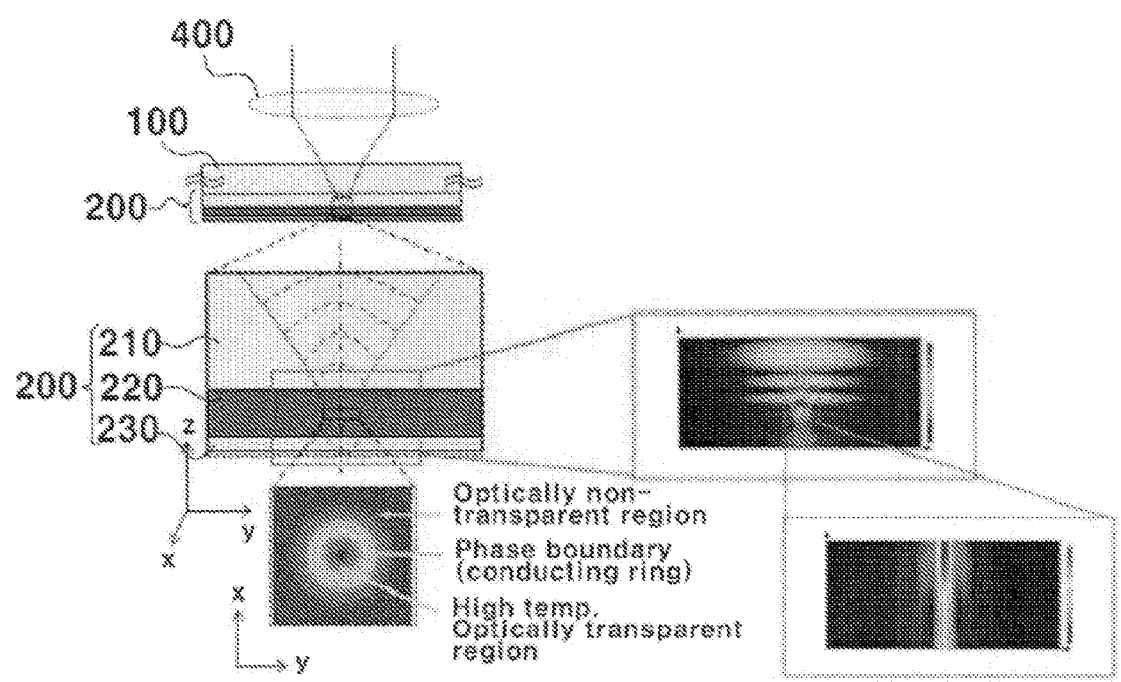
FIG. 6 is a view showing transition from an optically non-transparent region to an optically transparent region and restoration to the optically non-transparent region in a thin film layer for formation of dynamic optical nano apertures according to an embodiment of the present invention.
Figure 7:
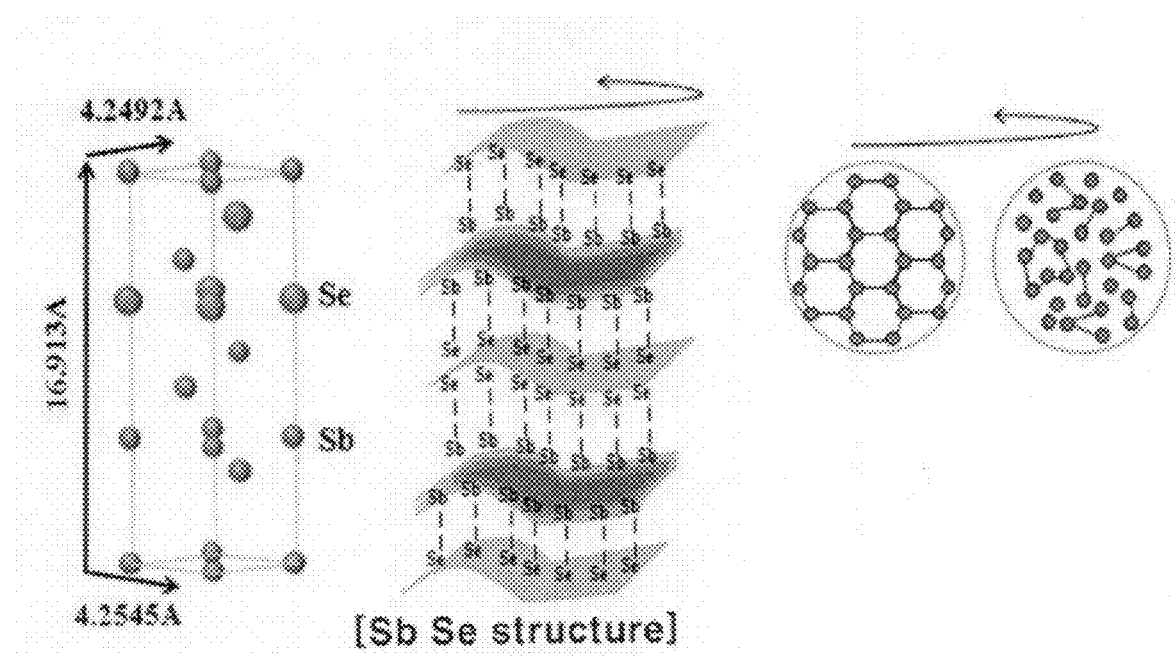
FIG. 7 is a view showing transition from an optically non-transparent region to a transparent region and restoration to the optically non-transparent region in a thin film layer for formation of dynamic optical nano apertures as a structure of Sb and Se according to an embodiment of the present invention.

FIG. 5 is a view showing transition from an optically non-transparent region to an optically transparent region in a thin film layer for formation of dynamic optical nano apertures according to an embodiment of the present invention, FIG. 6 is a view showing transition of an optically non-transparent region to an optically transparent region and restoration to the optically non-transparent region in a thin film layer for formation of dynamic optical nano apertures according to an embodiment of the present invention, and FIG. 7 is a view showing transition from an optically non-transparent region to an optically transparent region and restoration to the non-transparent region in a thin film layer for formation of dynamic optical nano apertures as a structure of Sb and Se according to an embodiment of the present invention.

At this point, a Sb—Se compound, AgOx or PtOx can be used as the thin film layer for formation of dynamic optical nano apertures 220.

Referring to FIG. 5 first, if energy is supplied as light is radiated through a light source, the thin film layer for formation of dynamic optical nano apertures is heated and changed from an optically non-transparent region to an optically transparent region. At this point, a near field is generated due to the difference of refractive index between the optically transparent region and the optically non transparent region.

In addition, describing the state of changing from an optically non-transparent region to an optically transparent region and restoring to the optically non-transparent region with reference to FIGS. 6 and 7, if light is radiated from the light source and the thin film layer for formation of dynamic optical nano apertures 220 is heated, a phenomenon of formation of dynamic optical nano apertures similar to an optically transparent state occurs at the center portion of the light, and instantaneous electrons are concentrated at the boundary between the center portion and a region not heated by the light. The electrons concentrated like this form a conducting ring and improve strength of the light. At this point, it is not that the phenomenon of formation of dynamic optical nano apertures occurs at the center portion, but as the p orbital of a material having optical anisotropy is misaligned by the heat and the second and third neighboring electrons in charge of the optical Phenomenon instantaneously change the array, optical absorption coefficients are lowered. However, it is not that the resonance coupling of the p orbital is broken, but if a proper energy passes through, the original optically transparent state is restored, and a near field is formed by this phenomenon.

Figure 8:
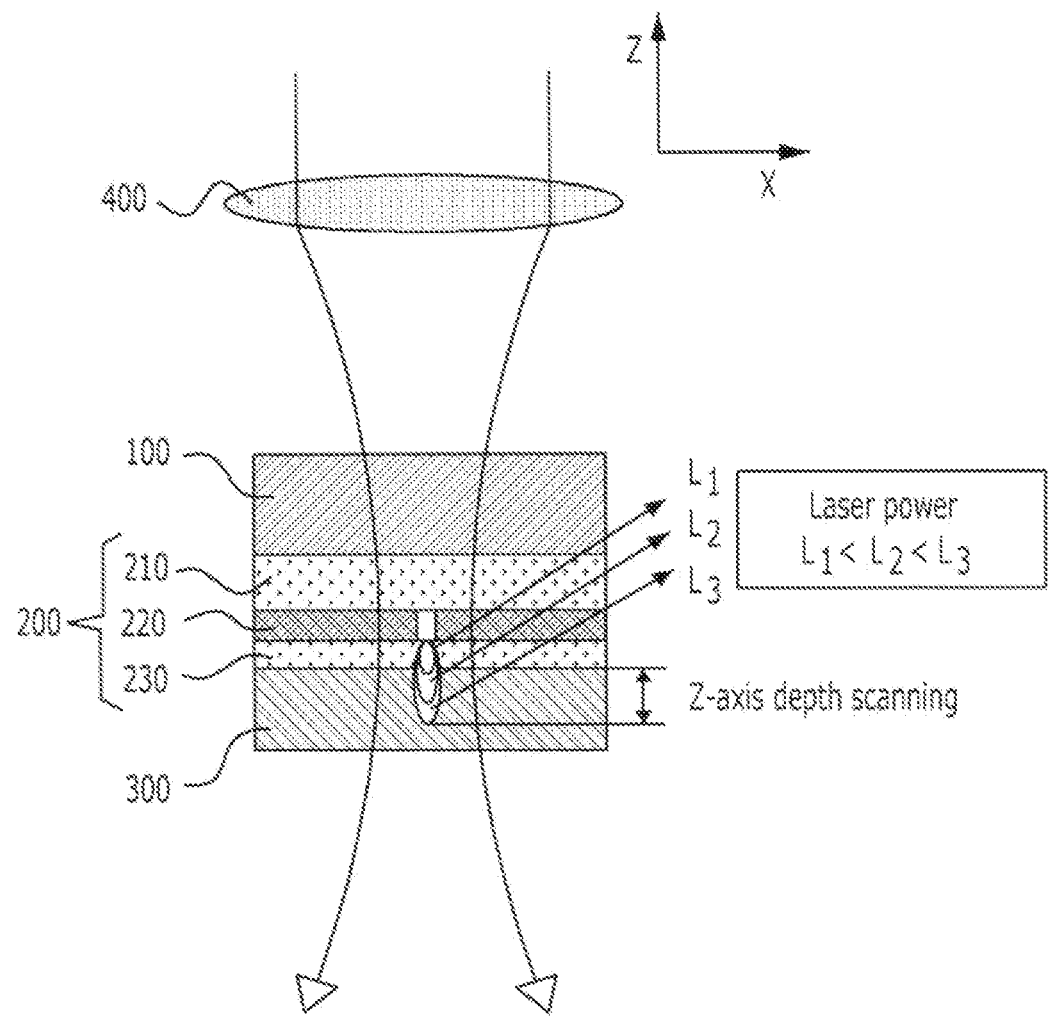
FIG. 8 is a view showing a depth of near field generation according to an amount of radiation by an embodiment of the present invention.
Figure 9:
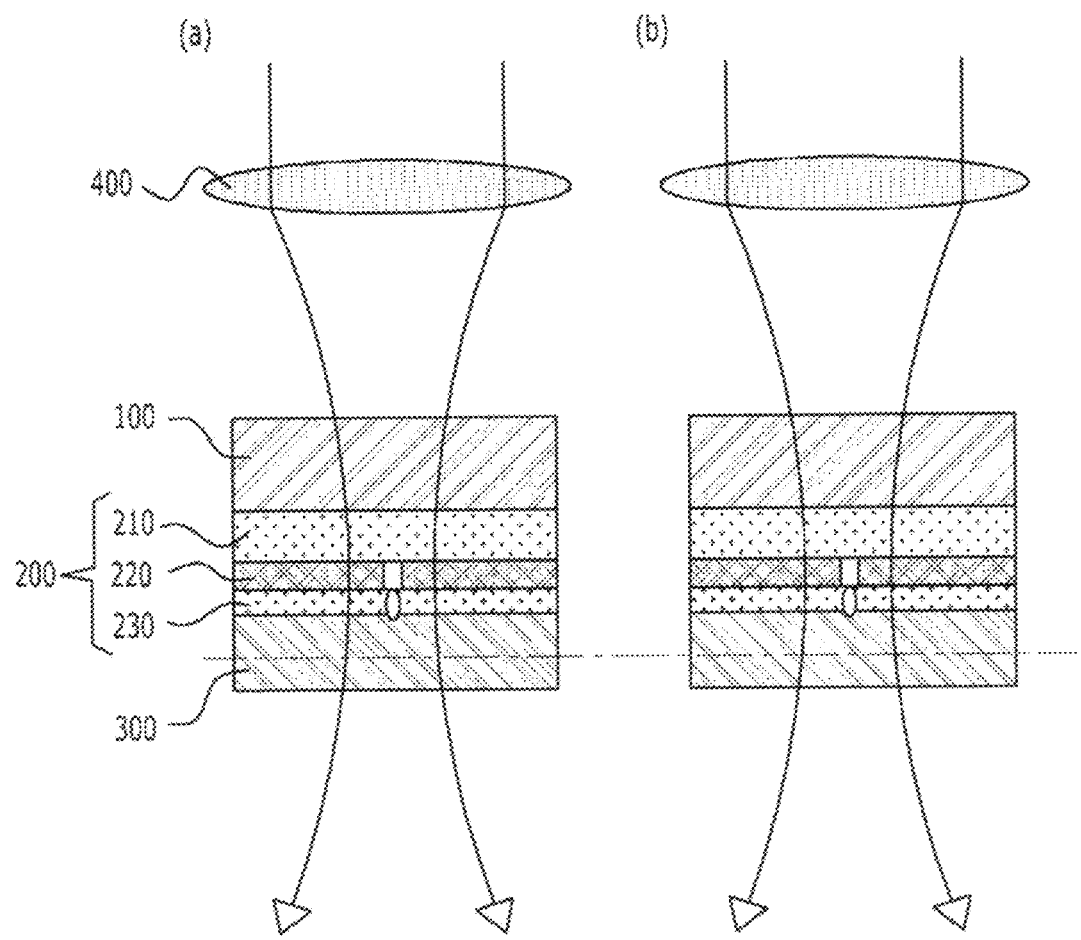
FIG. 9 is a view showing depth adjustment when a near field is generated according to an embodiment of the present invention.

FIG. 8 is a view showing a depth of near field generation based on an amount of radiation according to an embodiment of the present invention, and FIG. 9 is a view showing depth adjustment when a near field is generated according to an embodiment of the present invention.

Referring to FIGS. 8 and 9, if the amount of light entering into the flexible thin film for formation of dynamic optical nano apertures according to an embodiment of the present invention is adjusted, the amount of radiated energy is adjusted as a result, and thus a degree of changing from an optically non-transparent region to an optically transparent region and restoring to the optically non-transparent region can be adjusted according to adjustment of the energy. Accordingly, as shown in FIG. 8, an opening which will be formed in the depth direction can be adjusted when the near field is generated.

As the power of the energy radiated from the light source like a laser increases, depth of the opening also increases.

In addition, if two light sources respectively having a different wavelength are used, the depth can be formed to be different according to the wavelength.

According to an embodiment of the present invention, the near field optical imaging device may further includes a relay lens unit through which light proceeding toward the measured object or reflected from the measured object passes and including one or more lenses for focusing the light radiated from the light source; a multi-light array unit into which the light focused through the relay lens unit enters; and a photo detector for detecting light from the measured object.

In addition, although the photo detector may detect the light reflected from the measured object, it is also possible to position the photo detector under the measured object and detect the light passing through the measured object.

According to another embodiment of the present invention, there is provided a near field optical imaging device including: a first light source for radiating light of a first wavelength; a second light source for radiating light of a second wavelength; a relay lens unit through which light proceeding toward the measured object or reflected from the measured object passes and including one or more lenses for focusing the light radiated from the first light source or the second light source; a multi-light array unit into which the light focused through the relay lens unit enters; a thin film layer for formation of dynamic optical nano apertures, for generating a near field by the light radiated from the light sources and passing through the multi-light array unit; and a photo detector for detecting light from the measured object, in which a depth of the near field is adjusted by modifying the shape of the opening of the thin film layer for formation of dynamic optical nano apertures by adjusting the amount of the light radiated from the first light source or the second light source, and the depth of the near field generated by the first light source is different from the depth of the near field generated by the second light source.

At this point, the thin film layer for formation of dynamic optical nano apertures is the same as described above, and there is a difference in that the depth of a near field can be formed to be different from that of the other near field by using two light sources respectively having different wavelength.

In addition, if two light sources respectively having a different wavelength are used, various information can be acquired since information acquired from a light source is different from information acquired from the other.

Figure 10:
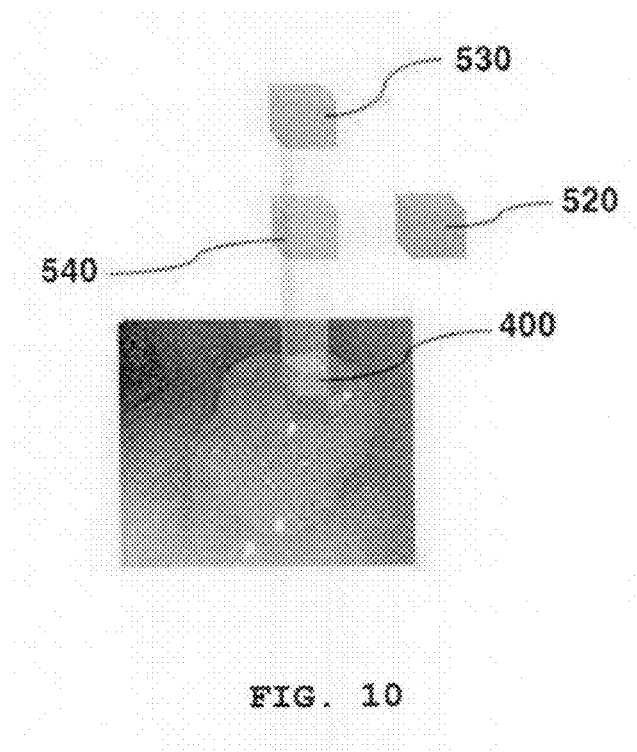
FIG. 10 is a view of imaging the surface of a stomach using an embodiment of the present invention.
Figure 11:
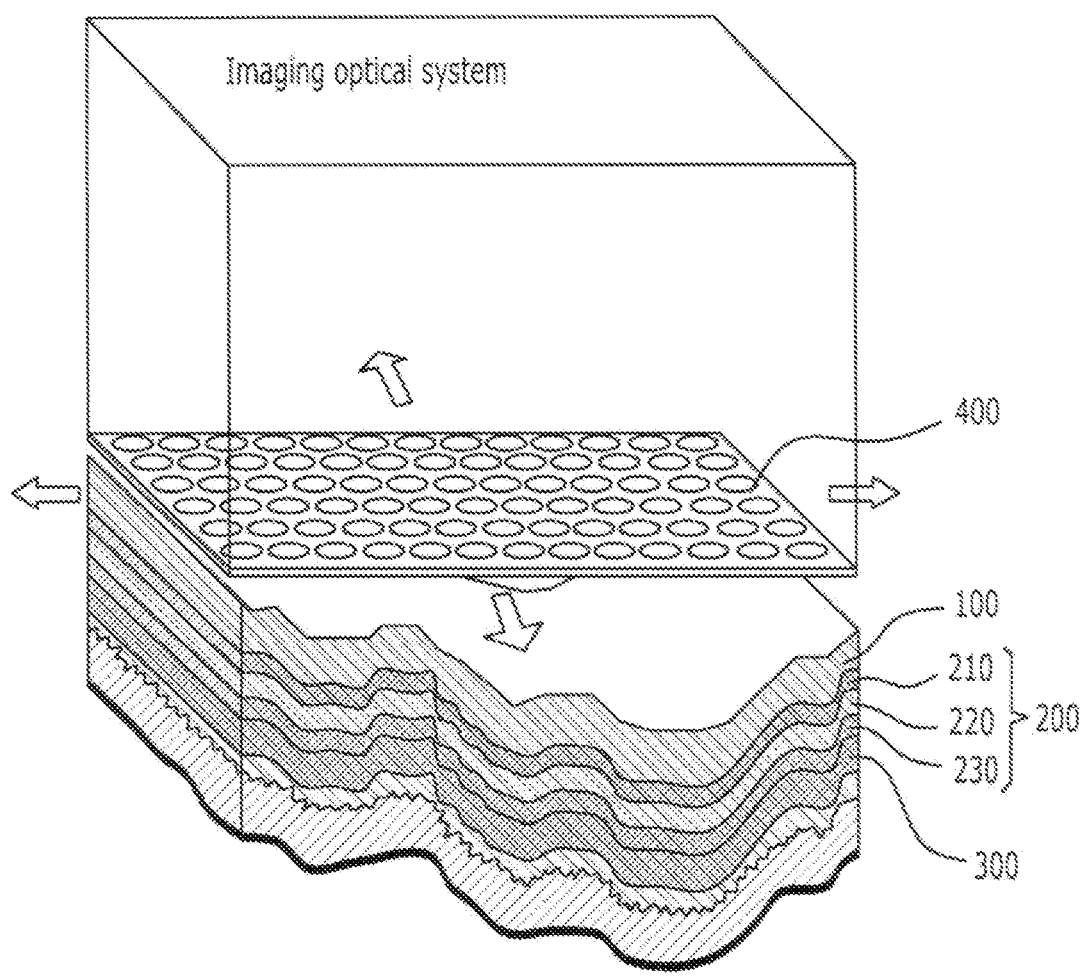
FIG. 11 is a view showing a method of scanning an image using an embodiment of the present invention.
Figure 12:
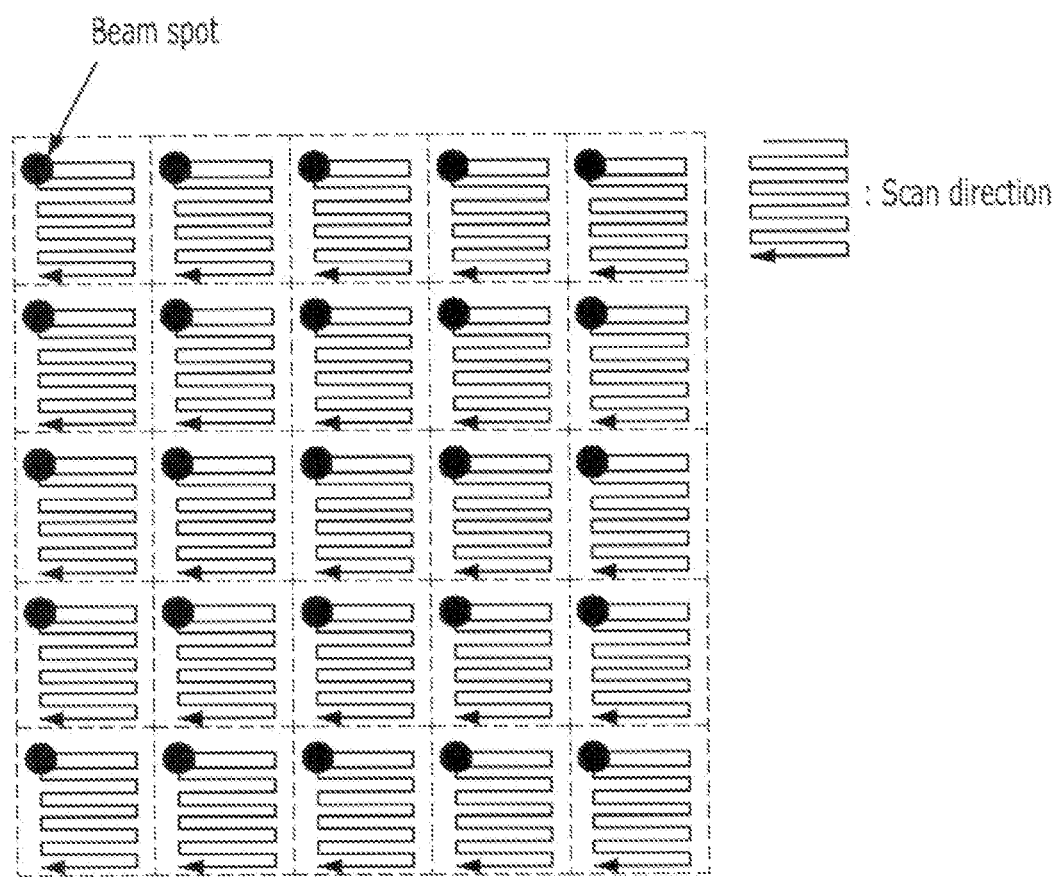
FIG. 12 is a view showing a method of imaging the entire area using a unit micro lens array when an image is scanned using an embodiment of the present invention.

FIG. 10 shows a view of imaging the surface of a stomach using an embodiment of the present invention, FIG. 11 is a view showing a method of scanning an image using an embodiment of the present invention, and FIG. 12 is a view showing a method of imaging the entire area using unit micro lens arrays when an image is scanned using an embodiment of the present invention.

According to an embodiment of the present invention, it is possible to take an image of the surface of a stomach by moving the entire optical system including a light source 530, a beam splitter 540, a photo detector 520 and a micro lens arrays 400 after attaching an optical head including a thin film layer for formation of dynamic optical nano apertures on the surface of the stomach. At this point, since a plurality of unit micro lenses is arranged, the entire area can be imaged if the micro lens array 400 is moved by a pitch of the unit micro lens. An embodiment of a scan method is shown in FIG. 12, and since a unit area can be scanned by moving a beam spot if a plurality of beam spots is used, the entire area can be imaged as a result.

In the embodiments of the present invention, there is provided a near field optical imaging device including a light source for radiating light of a far field optical system; and an optical head including a thin film layer for formation of dynamic optical nano apertures, combined with a measured object in one piece to generate a near field by a beam radiated from the light source, in which the measured object can be scanned in a depth direction by adjusting a depth of the near field, and the depth of the near field is adjusted by modifying the shape of the opening of the thin film layer for formation of dynamic optical nano apertures by adjusting the amount of the light radiated from the light source.

In addition, since the optical head including the thin film layer for formation of dynamic optical nano apertures includes a flexible substrate layer for tightly attaching and combining the measured object regardless of whether an external shape of the measured object is a curved surface or a flat surface, and a thin film layer for formation of dynamic optical nano apertures, combined with the flexible substrate layer in one piece to generate a near field by a beam radiated from the light source, a high resolution can be provided, and the problem of maintaining a gap can be solved since the flexible substrate layer can be flexibly modified and easily and tightly attach the measured object regardless of whether the external shape of the measured object is a curved surface or a flat surface.

In addition, since the optical head including the thin film layer for formation of dynamic optical nano apertures includes a first dielectric layer positioned on the top, a second dielectric layer positioned on the bottom, and a thin film layer for formation of dynamic optical nano apertures positioned between the first dielectric layer and the second dielectric layer and the thin film layer for formation of dynamic optical nano apertures is formed of a material having optical anisotropy, depth of the near field can be controlled by modifying the shape of the opening of the thin film layer for formation of dynamic optical nano apertures by adjusting the amount of radiated energy.

In addition, since imaging is accomplished by inducing a phenomenon of formation of dynamic optical nano apertures in a desired region, an optical system does not need to be aligned with the apertures separately.

In addition, since an anti-adhesion layer is further included on one side of the optical head including the thin film layer for formation of dynamic optical nano apertures contacting with the measured object, friction and contamination of the measured object can be prevented.

In addition, in another embodiment of the present invention, since two or more light sources respectively having a different wavelength are used, various information can be acquired by acquiring information corresponding to each of the wavelengths.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A near field optical imaging device comprising:
a light source for radiating light of a far field optical system; and
an optical head including
a thin film layer for formation of dynamic optical nano apertures, combined with a measured object in one piece to generate a near field by a beam radiated from the light source, wherein
the measured object can be scanned in a depth direction by adjusting a depth of the near field, and the depth of the near field is adjusted by modifying a shape of an opening of the thin film layer for formation of dynamic optical nano apertures by adjusting an amount of the light radiated from the light source.

2. The device according to claim 1, wherein the optical head includes:
a flexible substrate for tightly attaching and combining the measured object regardless of whether an external shape of the measured object is a curved surface or a flat surface; and
a thin film layer for formation of dynamic optical nano apertures, combined with the flexible substrate in one piece to generate a near field by a beam radiated from the light source.

3. The device according to claim 2, wherein the optical head includes a first dielectric layer positioned on a top, a second dielectric layer positioned on a bottom, and a thin film layer for formation of dynamic optical nano apertures positioned between the first dielectric layer and the second dielectric layer.

4. The device according to claim 3, wherein the thin film layer for formation of dynamic optical nano apertures is a layer formed of a material having optical anisotropy.

5. The device according to claim 4, wherein in the thin film layer for formation of dynamic optical nano apertures, the depth of the near field is adjusted in a process of changing the material having optical anisotropy from an optically non-transparent region to an optically transparent region.

6. The device according to claim 3, wherein the thin film layer for formation of dynamic optical nano apertures is a Sb—Se compound, AgOx or PtOx.

7. The device according to claim 3, wherein the first dielectric layer and the second dielectric layer are oxide-based, nitride-based, carbide-based materials.

8. The device according to claim 7, wherein the oxide-based material is any one of SiOx, ZnS—SiOx, GeOx, AlOx, BeOx, ZrOx, BaTiOx, SrTiOx and TaOx.

9. The device according to claim 7, wherein the nitride-based material is any one of SiNx, BNx and AlNx.

10. The device according to claim 7, wherein the carbide-based material is SiCx.

11. The device according to claim 3, wherein thickness of the first dielectric layer is 30 to 500 nm, thickness of the thin film layer for formation of dynamic optical nano apertures is 5 to 30 nm, and thickness of the second dielectric layer is 5 to 60 nm.

12. The device according to claim 2, wherein the flexible substrate 100 is a sort of film or glass, and any one of Polycarbonate (PC), Cyclo olefin polymer (COP), polyimide (PI), Polyethylene terephthalate (PET), Oriented Poly prophylene (OPP), Polyethylene (PE), Poly prophylene (PP), Poly methyl methacrylate (PMMA) and acryl is used as a film, and any one of Sodalime glass, borosilicate glass, fused silica glass, quartz and biocompatible polymer (polylactic acid (PLA), poly glycolic acid (PGA), poly lactic co glycolic acid (PLGA), Poly L Lactic Acid (LPLA), Poly DL Lactic Acid (DLPLA), poly capro lactone (PCL), poly dioxanone (PDO) or Polydimethylsiloxane (PDMS)) is used as a glass.

13. The device according to claim 12, wherein thickness of the film is 0.04 to 500 μm.

14. The device according to claim 2, wherein the optical head includes an anti-adhesion layer for preventing friction and contamination of the measured object on one side of the optical head for formation of dynamic optical nano apertures contacting with the measured object.

15. The device according to claim 1, wherein the optical system includes any one of macro optics, a hologram beam modulator, a DMD mirror, a micro lens array and a scanner.

16. The device according to claim 1, further comprising:
a relay lens unit through which light proceeding toward the measured object or reflected from the measured object passes and including one or more lenses for focusing the light radiated from the light source;
a multi-light array unit into which the light focused through the relay lens unit enters; and
a photo detector for detecting light from the measured object.

17. The device according to claim 16, wherein the photo detector is positioned under the measured object.

18. A near field optical imaging device comprising:
a first light source for radiating light of a first wavelength;
a second light source for radiating light of a second wavelength;
a relay lens unit through which light proceeding toward a measured object or reflected from the measured object passes and including one or more lenses for focusing the light radiated from the first light source or the second light source;
a multi-light array unit into which the light focused through the relay lens unit enters;
a thin film layer for formation of dynamic optical nano apertures, for generating a near field by the light radiated from the light sources and passing through the multi-light array unit; and
a photo detector for detecting light from the measured object, wherein
a depth of the near field is adjusted by modifying a shape of an opening of the thin film layer for formation of dynamic optical nano apertures by adjusting an amount of the light radiated from the first light source or the second light source, and the depth of the near field generated by the first light source is different from the depth of the near field generated by the second light source.

* * * * *